United States Patent
Weaver et al.

(10) Patent No.: US 11,040,915 B2
(45) Date of Patent: Jun. 22, 2021

(54) METHOD OF FORMING CMC COMPONENT COOLING CAVITIES

(71) Applicant: General Electric Company, Schenectady, NY (US)

(72) Inventors: Matthew Mark Weaver, Loveland, OH (US); Kurtis C. Montgomery, Mason, OH (US); Michael James Verrilli, Loveland, OH (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 16/127,501

(22) Filed: Sep. 11, 2018

(65) Prior Publication Data
US 2020/0079697 A1     Mar. 12, 2020

(51) Int. Cl.
| | |
|---|---|
| *C04B 35/80* | (2006.01) |
| *C04B 35/64* | (2006.01) |
| *C04B 35/628* | (2006.01) |
| *C04B 35/634* | (2006.01) |
| *C04B 35/638* | (2006.01) |

(Continued)

(52) U.S. Cl.
CPC ........ *C04B 35/80* (2013.01); *C04B 35/62844* (2013.01); *C04B 35/62868* (2013.01); *C04B 35/638* (2013.01); *C04B 35/6342* (2013.01); *C04B 35/63468* (2013.01); *C04B 35/64* (2013.01); *C04B 35/657* (2013.01); *C04B 2235/386* (2013.01); *C04B 2235/6028* (2013.01); *C04B 2235/612* (2013.01); *C04B 2235/616* (2013.01); *F01D 5/187* (2013.01); *F01D 5/282* (2013.01); *F01D 9/02* (2013.01); *F01D 25/12* (2013.01); *F05D 2220/32* (2013.01); *F05D 2230/10* (2013.01); *F05D 2230/40* (2013.01); *F05D 2230/60* (2013.01); *F05D 2230/90* (2013.01);

(Continued)

(58) Field of Classification Search
CPC .......... F01D 5/187; F01D 5/288; F01D 9/041; C04B 35/80; C04B 35/62844; C04B 35/62868; C04B 35/63468; C04B 35/638; C04B 35/64; C04B 35/657
See application file for complete search history.

(56) References Cited

U.S. PATENT DOCUMENTS

| | | | |
|---|---|---|---|
| 3,235,346 A | 2/1966 | Hucke | |
| 4,376,004 A * | 3/1983 | Bratton | F01D 5/184 156/89.27 |

(Continued)

OTHER PUBLICATIONS

U.S. Appl. No. 15/632,739, filed Jun. 26, 2017.

*Primary Examiner* — Alex B Efta
(74) *Attorney, Agent, or Firm* — Dority & Manning, P.A.

(57) ABSTRACT

A method of forming a composite component. The method includes laying up a plurality of composite plies to form a composite ply core. Another step of the method includes partially processing the composite ply core to form a green state core. The method further includes machining a cooling cavity on an exterior surface of the green state core. Additionally, the method includes inserting a filler material within the cooling cavity. A further step includes wrapping composite plies around the green state core and filler material to secure the filler material and form an outer enclosure. In one step, the method includes processing the green state core and outer enclosure to form the composite component.

20 Claims, 8 Drawing Sheets

(51) Int. Cl.
*C04B 35/657* (2006.01)
*F01D 5/18* (2006.01)
*F01D 5/28* (2006.01)
*F01D 25/12* (2006.01)
*F01D 9/02* (2006.01)

(52) U.S. Cl.
CPC ...... *F05D 2240/12* (2013.01); *F05D 2240/24* (2013.01); *F05D 2260/20* (2013.01); *F05D 2300/6033* (2013.01)

(56) References Cited

U.S. PATENT DOCUMENTS

| | | | |
|---|---|---|---|
| 5,198,282 A | 3/1993 | Baker et al. | |
| 5,436,042 A | 7/1995 | Lau et al. | |
| 6,709,230 B2 | 3/2004 | Morrison et al. | |
| 7,169,465 B1 | 1/2007 | Karandikar et al. | |
| 7,247,002 B2 | 7/2007 | Albrecht et al. | |
| 7,510,379 B2 | 3/2009 | Marusko et al. | |
| 7,550,107 B2 | 6/2009 | Morrison et al. | |
| 8,151,437 B2 | 4/2012 | Muller et al. | |
| 8,491,743 B2 | 7/2013 | Pham et al. | |
| 8,715,439 B2 | 5/2014 | Chakrabarti et al. | |
| 8,978,729 B2 | 3/2015 | Pham et al. | |
| 9,090,027 B2 | 7/2015 | Sutton et al. | |
| 9,259,858 B2 | 2/2016 | Gupta et al. | |
| 9,410,437 B2 | 8/2016 | Paige et al. | |
| 9,482,108 B2 | 11/2016 | Garcia Crespo | |
| 9,499,253 B1 | 11/2016 | White | |
| 9,739,157 B2 | 8/2017 | Uskert et al. | |
| 9,835,035 B2 | 12/2017 | Mueller et al. | |
| 2004/0163262 A1 | 8/2004 | King et al. | |
| 2007/0072007 A1 | 3/2007 | Carper et al. | |
| 2011/0259017 A1* | 10/2011 | Lacy | F01D 5/186 60/806 |
| 2012/0145371 A1* | 6/2012 | Bunker | F01D 5/28 165/177 |
| 2013/0185924 A1 | 7/2013 | Bellanger et al. | |
| 2014/0127457 A1* | 5/2014 | Hillier | B32B 3/266 428/137 |
| 2014/0294572 A1 | 10/2014 | Hillier et al. | |
| 2015/0369052 A1 | 12/2015 | de Diego | |
| 2016/0003094 A1 | 1/2016 | Renggli et al. | |
| 2016/0265370 A1 | 9/2016 | Benson | |
| 2016/0348513 A1 | 12/2016 | Weaver et al. | |
| 2017/0101873 A1 | 4/2017 | Morgan et al. | |
| 2017/0122113 A1 | 5/2017 | Kittleson et al. | |
| 2017/0328217 A1* | 11/2017 | Gallier | F01D 5/18 |
| 2017/0362941 A1 | 12/2017 | Craig, III | |

\* cited by examiner

METHOD OF FORMING CMC COMPONENT COOLING CAVITIES

FIELD

The present subject matter relates generally to composite components of turbomachines. More particularly, the present subject matter relates to cooling cavities for ceramic matrix composite turbine rotor blades and turbine stator vanes and the manufacture of cooling cavities for such composite components.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. However, increased combustion temperatures can negatively impact the gas turbine engine components, for example, by increasing the likelihood of material failures. Thus, while increased combustion temperatures can be beneficial to turbine performance, some components of the gas turbine engine may require cooling features or reduced exposure to the combustion gases to decrease the negative impacts of the increased temperatures on the components.

Typically, the turbine section includes one or more stator vanes and rotor blade stages, and each stator vane and rotor blade stage comprises a plurality of airfoils, e.g., nozzle airfoils in the stator vane portion and blade airfoils in the rotor blade portion. Because the airfoils are downstream of the combustion section and positioned within the flow of combustion gases, the airfoils generally include one or more cooling features for minimizing the effects of the relatively hot combustion gases, such as, e.g., film holes, cooling holes, or slots, that may provide cooling within and/or over the surface of the airfoils. For example, cooling apertures may be provided throughout a component that allow a flow of cooling fluid from within the component to be directed over the outer surface of the component. Further, the airfoils generally include cavities or conduits for supplying compressed, cool air to the cooling features, such as from the compressor section.

In general, turbine performance and efficiency may be improved by increased combustion gas temperatures. Non-traditional high temperature materials, such as ceramic matrix composite (CMC) materials, are more commonly being used for various components within gas turbine engines. For example, because CMC materials can withstand relatively extreme temperatures, there is particular interest in replacing components within the flowpath of the combustion gases with CMC materials. However, even though CMC components may withstand more extreme temperatures than typical components, CMC components still may require cooling features or reduced exposure to the combustion gases to decrease a likelihood of negative impacts of increased combustion gas temperatures, e.g., material failures or the like.

Though many benefits may be realized by utilizing CMC components, CMC materials may have drawbacks. For example, components formed from CMC materials may have a lower thermal conductivity than similar components formed from nickel alloys. The decreased thermal conductivity of CMC components may necessitate the cooling features and/or the cavities or conduits for supplying the compressed, cool air be closer to the airfoil surface. In addition, cooling features, cavities, and/or conduits with complex, intricate geometry may be particularly difficult to form in CMC components.

As such, CMC components with complex cooling geometry as well as associated methods of producing such CMC components would be useful.

BRIEF DESCRIPTION

Aspects and advantages will be set forth in part in the following description, or may be obvious from the description, or may be learned through practice of the invention.

In one aspect, the present disclosure is directed to a method of forming a composite component. The method includes laying up a plurality of composite plies to form a composite ply core. Another step of the method includes partially processing the composite ply core to form a green state core. The method further includes machining a cooling cavity on an exterior surface of the green state core. Additionally, the method includes inserting a filler material within the cooling cavity. A further step includes wrapping composite plies around the green state core and filler material to secure the filler material and form an outer enclosure. In one step, the method includes processing the green state core and outer enclosure to form the composite component. In one embodiment of the method, the composite component may be a gas turbine engine component. For example, the composite component may be at least one of a turbine rotor blade or a turbine stator vane.

In certain embodiments, the method may include boring a film hole to fluidly couple the cooling cavity to an outer surface of the outer enclosure. For example, a drill, a milling machine, or other capable machine may be used to bore a film hole through the outer enclosure. In certain embodiments, a plurality of film holes may be bored through the outer enclosure, such as two or more film holes. It should be recognized that the film hole(s) may be bored at any location where boring will create a film hole into the cooling cavity. Further, in embodiments where the outer enclosure defines an airfoil, the film hole(s) may be placed equally along a span and/or chord of the outer enclosure. Such equally spaced film holes may provide a more even supply of compressed, cool air to the outer surface of the outer enclosure.

In a further embodiment, the method may include machining a second cooling cavity on the exterior surface of the green state core. In such an embodiment, a further step may include inserting a second filler material within the second cooling cavity. It should be recognized that in other embodiments the method may include machining a plurality of cooling cavities on the exterior surface of the green state core. Further, a plurality of associated filler materials may be inserted in each of the plurality of cooling cavities. In a still further embodiment, the method may include machining a cross-over hole on the exterior surface of the green state core between the cooling cavity and the second cooling cavity.

Such a cross-over hole may allow the cooling cavities to be fluidly coupled after the component is complete. It should be recognized that a plurality of cross-over holes may be machined between the cooling cavity and the second cooling cavity. Further, such cross-over holes may be equally space along the length of one of the cooling cavities. In other embodiments, the cross-over holes may define non-uniform gaps between each cross-over hole.

In embodiments with three or more cooling cavities, one or more cross-over holes may be machined between each cooling cavity and an adjacent cooling cavity. For example, two or more cooling cavities may be fluidly coupled in a series by the cross-over holes. In other embodiments, the cross-over holes may be machined on the exterior surface of the green state core between groups of cooling cavities and/or one or more pairs of cooling cavities. In one embodiment, the method may include inserting a third filler material within the cross-over hole. For example, a third filler material may be inserted within each cross-over hole machined on the green state core. In another embodiment, the third filler material(s) may be inserted within a portion of the cross-over holes.

In a further embodiment of the method, at least one of the composite plies may be a prepreg ply. For example, at least a portion of or all of the composite plies used to form the composite ply core may be prepreg plies. Still further, a portion of the composite plies used to form the outer enclosure may be prepreg plies. In one particular embodiment, all of the composite plies may be prepreg plies. In a further embodiment, at least one of the composite plies may a ceramic matrix composite ply, such as all of the composite plies. In a still further embodiment, at least one of the composite plies may be a ceramic matrix composite prepreg ply, such as all of the composite plies.

In one embodiment of the method, partially processing the composite ply core may include compacting the composite ply core. In another embodiment of the method, partially processing the composite ply core may include autoclaving the composite ply core. In a still further embodiment of the method, partially processing the composite ply core may include both compacting and autoclaving the composite ply core. In another embodiment, processing the green state core and outer enclosure may include autoclaving the green state core and the outer enclosure to form an autoclaved body. Further, another step may include firing the autoclaved body to form a fired body. In some embodiments, processing the green state core and outer enclosure may include further burning out the composite plies and the filler material. An additional step may include densifying the fired body to form the composite component. In certain embodiments, processing the green state core and the outer enclosure may include at least one of melt infiltration or polymer infiltration and pyrolysis.

In another embodiment of the method, the filler material may include at least one of a polymer matrix, a x-linked polyvinyl butyral, a poly paraphenylene terephthalamide, or a low melting temperature alloy. Further, in other embodiments, the method may include coating at least one of the filler material or the cooling cavity with boron nitride. For example, the filler material may be doped in boron nitride. It should be recognized that coating the filler material with boron nitride may prevent certain materials, such as silicon, from filling the cooling cavity while processing the green state core and outer enclosure. More specifically, in certain embodiments, the boron nitride may adhere to the cooling cavity after the filler material dissipates, dissolves, and/or burns out. As such, the left over boron nitride may at least partially seal the cooling cavity from silicon leaking into and filling the cooling cavity. Though, in other embodiments, the boron nitride may be adhered directly to the surfaces of the cooling cavity. It should be further understood that the method may further include any of the additional features as described herein.

In another aspect, the present disclosure is directed to a method of forming a cooling cavity within a composite component. The method includes laying up a plurality of composite plies to form a composite ply core. Another step includes partially processing the composite ply core to form a green state core. The method further includes machining a cooling cavity on an exterior surface of the green state core. A further step includes inserting a filler material within the cooling cavity. The method also includes securing the filler material within the cooling cavity. An additional step of the method includes processing the green state core to form a finished core with cooling cavities on the exterior surface.

In one embodiment of the method, processing the green state core may include burning out the composite plies and the filler material. In certain embodiments, the filler material may include at least one of a polymer matrix, a x-linked polyvinyl butyral, a poly paraphenylene terephthalamide, or a low melting temperature alloy. Still, in other embodiments, the method may include coating at least one of the filler material or the cooling cavity with boron nitride. It should be further understood that the method may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
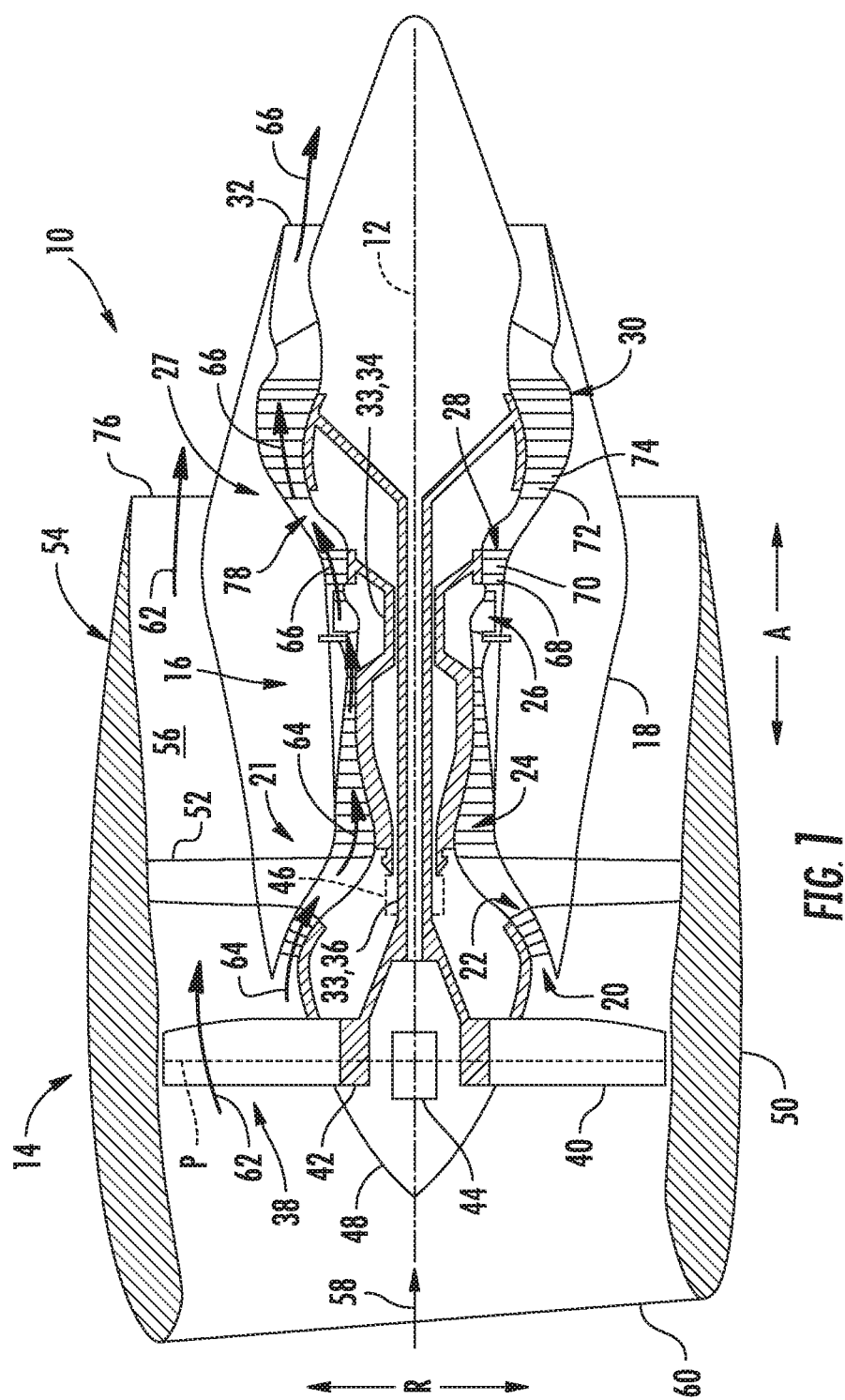
FIG. 1 illustrates a schematic cross-sectional view of a gas turbine engine in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A component with cooling cavities formed via green machining of a green state core may allow for more complex cooling geometry within the component. As such, more complex cooling cavities and associated cross-over holes and/or film holes may allow for a more robust film cooling on an outer surface of the component, leading to more effective cooling. Further, such cooling cavities may increase engine efficiency by reducing the amount of compressed, cool air necessitated from the compressor section or provided from another source. It should also be recognized that cooling cavities formed on an exterior surface of the core may allow for a more simple manufacture of the core itself. For example, internal conduits within the core for supplying the compressed, cool air may be unnecessary. Further, the core may be formed as a single solitary component without the need of subassemblies to define the internal conduits.

It should be appreciated that, although the present subject matter will generally be described herein with reference to a gas turbine engine, the disclosed systems and methods may generally be used on components within any suitable type of turbine engine, including aircraft-based turbine engines, land-based turbine engines, and/or steam turbine engines. Further, though the present subject matter is generally described in reference to stators and rotors in a turbine section, the disclosed systems and methods may generally be used on any component subjected to increased temperatures where film cooling may be desirable.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is configured as a high-bypass turbofan jet engine. Though, in other embodiments, the gas turbine engine 10 may be configured as a low-bypass turbofan engine, a turbojet engine, a turboprop engine, a turboshaft engine, or other turbomachines known in the art. As shown in FIG. 1, the gas turbine engine 10 defines an axial direction A (extending parallel to a longitudinal centerline 12 provided for reference) and a radial direction R. In general, the gas turbine engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 27 including a high pressure (HP) turbine 28 and a low pressure (LP) turbine 30; and a jet exhaust nozzle section 32. The gas turbine engine 10 includes at least one rotating shaft 33 drivingly coupled between the compressor section 21 and the turbine section 27. For example, a high pressure (HP) shaft or spool 34 may drivingly connect the HP turbine 28 to the HP compressor 24. Similarly, a low pressure (LP) shaft or spool 36 may drivingly connect the LP turbine 30 to the LP compressor 22.

For the depicted embodiment, fan section 14 includes a variable pitch fan 38 having a plurality of fan blades 40 coupled to a disk 42 in a spaced apart manner. As depicted, fan blades 40 extend outward from disk 42 generally along the radial direction R. Each fan blade 40 is rotatable relative to disk 42 about a pitch axis P by virtue of the fan blades 40 being operatively coupled to a suitable actuation member 44 configured to vary the pitch of the fan blades 40. Fan blades 40, disk 42, and actuation member 44 are together rotatable about the centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 so as to define a bypass airflow passage 56 therebetween.

During operation of the gas turbine engine 10, a volume of air 58 enters the gas turbine engine 10 through an associated inlet 60 of the outer nacelle 50 and/or fan section 14. As the volume of air 58 passes across fan blades 40, a first portion of the volume of air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide hot combustion gas 66.

The hot combustion gas 66 are routed through the HP turbine 28 where a portion of thermal and/or kinetic energy from the hot combustion gas 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The hot combustion gas 66 are then routed through the LP turbine 30 where a second portion of thermal and kinetic energy is extracted from the hot combustion gas 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the variable pitch fan 38.

The hot combustion gas 66 is subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. At least one of the combustion section 26, HP turbine 28, the LP turbine 30, or the jet exhaust nozzle section 32 at least partially define a flowpath 78 for routing the hot combustion gas 66 through the core turbine engine 16. Various components may be positioned in the flowpath 78 such as the HP turbine stator vanes 68, HP turbine rotor blades 70, the LP turbine stator vanes 72, and/or the LP turbine rotor blades 74. Further, such components may require cooling to withstand the increased temperatures of the hot combustion gas 66.

Figure 2:
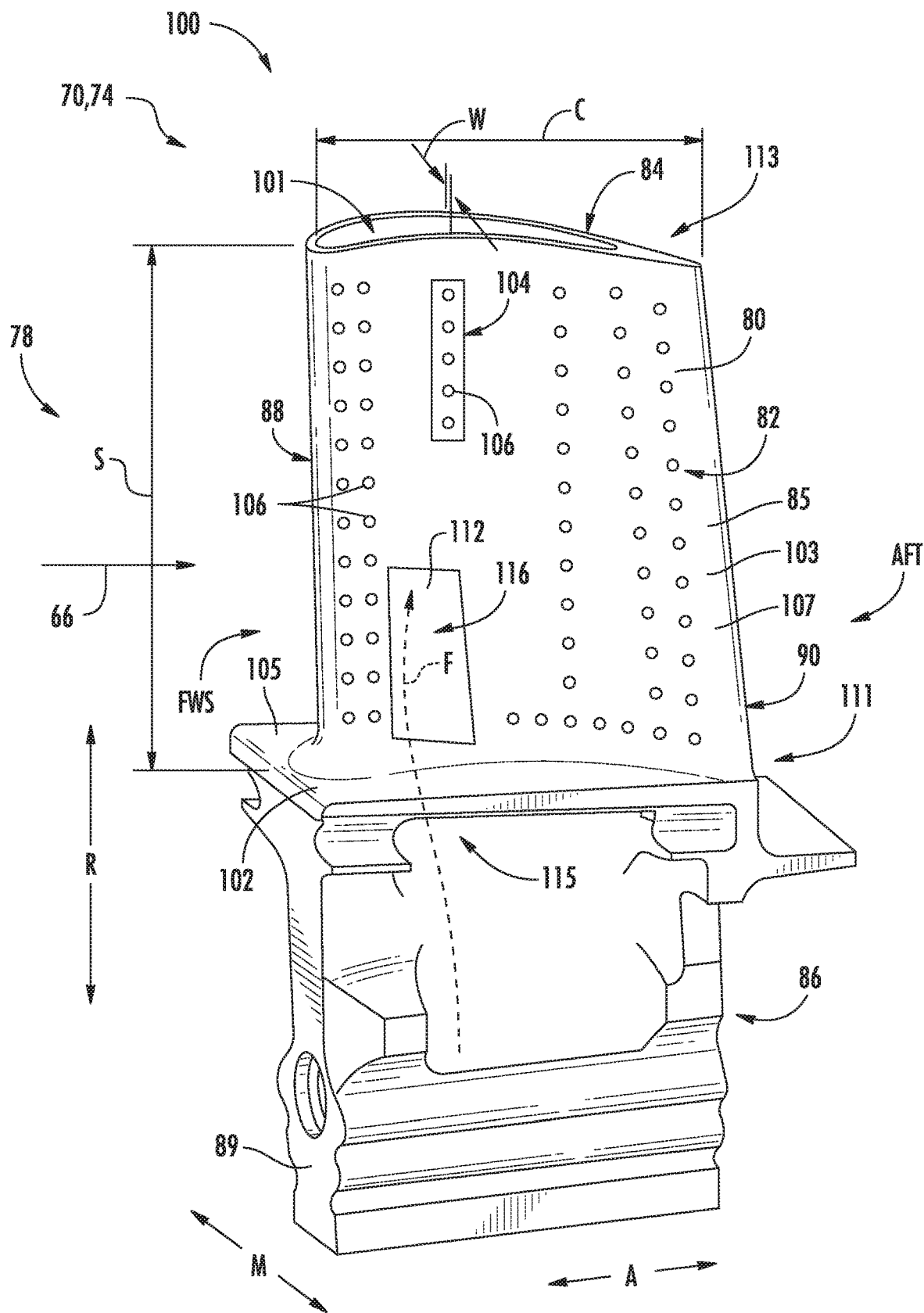
FIG. 2 illustrates a perspective view of one embodiment of a component of the gas turbine engine according to aspects of the present disclosure, particularly illustrating the component configured as a turbine rotor blade.

Referring now to FIG. 2, a perspective view of one embodiment of a component 100 of the gas turbine engine 10 is illustrated according to aspects of the present disclosure. Particularly, FIG. 2 illustrates the component configured as a turbine rotor blade. In other embodiments, the component 100 may be any other component of the gas turbine engine such as various shrouds, liners, bands, etc. of the gas turbine engine 10. For instance, the component 100 may be any structure that at least partially defines the flowpath 78 for the hot combustion gas 66, abuts the flowpath 78 for the hot combustion gas 66, and/or extends into the flowpath 78 for the hot combustion gas 66.

The component 100 may include a core 101 and an outer enclosure 103. The core 101 may include an exterior surface 112 extending along a length between a first end 111 and a second end 113. Further, the core 101 may at least partially define a cooling cavity 116 on the exterior surface 112 extending from the first end 111 along at least a portion of the length of the core 101. The core 101 and cooling cavity 116 will be described in more detail below in regards to, e.g., FIG. 4. The cooling cavity 116 may be fluidly coupled to an air supply (e.g., a cool air supply 115 as described in more detail below) at the first end 111 to supply cool air F to the component 100. The outer enclosure 103 may abut the flowpath 78 such that the hot combustion gas 66 flows past and/or through the component 100. The outer enclosure 103 may include an outer surface 107. The outer enclosure 103 is positioned outside the core 101 and extends from the first end 111 of the core 101 along at least a portion of the length of the core 101.

Still referring to FIG. 2, in one embodiment, the component 100 may be a turbine rotor blade. For example, the turbine rotor blade may be the LP turbine rotor blade 74 or the HP turbine rotor blade 70. In other embodiments, the component 100 may be any other turbine rotor blade of the gas turbine engine 10, such as an intermediate turbine blade. In such embodiments, the component 100 may include an inner band 102 positioned at the first end 111 with an inner band surface 105. For example, the inner band surface 105 may at least partially defining the flowpath 78 such that the hot combustion gas 66 flows through the flowpath 78. As such, the inner band surface 105 may define an inner most boundary of the flowpath 78 in a radial direction R. In one particular embodiment, the inner band 102 may be configured as a platform.

Still further, a blade root 86 may be coupled to a turbine rotor disk (not shown), which in turn is coupled to the rotating shaft 33 (e.g., FIG. 1). It will be readily understood that, as is depicted in FIG. 2 and is generally well-known in the art, the blade root 86 may define a projection 89 having a dovetail or other shape for receipt in a complementarily shaped slot in the turbine rotor disk to couple the turbine rotor blade 70, 74 to the disk. Of course, each turbine rotor blade 70, 74 may be coupled to the turbine rotor disk and/or rotating shaft 33 in other ways as well. Generally, the hot combustion gas 66 may flow from the combustion section 26 upstream of the component 100 past or through the component 100. It should be recognized that the flowpath 78 may further be defined by the outer casing 18 as described in regards to FIG. 1 and/or adjacent components 100 including respective inner bands 102. The inner band 102 may be heated by the hot combustion gas 66 flowing past the inner band 102.

In any event, turbine rotor blades 70, 74 may be coupled to the turbine rotor disks such that a row of circumferentially adjacent turbine rotor blades 70, 74 extend radially outward from the perimeter of each disk into, i.e., the flowpath 78. The hot combustion gas 66 flowing through the flowpath 78 may create a pressure differential over the turbine rotor blades 70, 74 causing the turbine rotor blades 70, 74 and thus the rotating shaft 33 to rotate. As such, the turbine rotor blades 70, 74 may transform the kinetic and/or thermal energy of the hot combustion gas 66 into rotational energy to drive other components of the gas turbine engine 10 (e.g., one or more compressors 22, 24 via one or more rotating shafts 33).

It should be recognized that the outer enclosure 103 may be configured as an airfoil 80. In such embodiments, the outer surface 107 may include an airfoil surface 85. Further, the airfoil surface 85 may include a pressure side 82 and a suction side 84. The airfoil surface 85 may also include a leading edge 88 at a forward position of the airfoil 80 in the axial direction A. The airfoil surface 85 may further include a trailing edge 90 at an aft position of the airfoil 80 in the axial direction A. Further, the airfoil 80 may extend from a blade root 86 to a blade tip 87 along a span S. For example, the blade root 86 may be approximately at the first end 111 of the core 101, and the blade tip 87 may be approximately at the second end 113. As such, the airfoil 80 may extend out into the flowpath 78 of the hot combustion gas 66. Further, the hot combustion gas 66 may flow over a combination of the pressure side 82, suction side 84, leading edge 88, and/or trailing edge 90 and thereby heat the airfoil 80. The airfoil 80 may define a chord C extending axially between the opposite leading and trailing edges 88, 90. Moreover, airfoil 80 may define a width W between the pressure side 82 and the suction side 84. The width W of airfoil 80 may vary along the span S.

The component 100 may also include the cooling cavity 116 defined within the outer enclosure 103 to supply the cool air F to the component 100 (as described in more detail below in regards to FIG. 4). It should be recognized that the cooling cavity 116 may be fluidly coupled to the air supply and receive pressurized, cool air F from the compressor section 21 (see, e.g., FIG. 1). In such embodiments, the air supply may be the cool air supply 115. In other embodiments, the cool air F may be pressurized, cool air F from another component of the gas turbine engine 10, such as a pump or the bypass airflow passage 56. The cool air F received within the cooling cavity 116 is generally cooler than the hot combustion gas 66 flowing against or over the outer surface 107 of the outer enclosure 103.

The outer enclosure 103 may define a film hole 106 in fluid communication with the cooling cavity 116 and extending through the outer enclosure 103. For example, the film hole 106 may be defined anywhere along the outer surface 107 of the outer enclosure 103, such as the airfoil surface 85. The component 100 may further include a plurality of film holes 106 extending between the cooling cavity 116 and a plurality of film holes 106. In other embodiments, the outer surface 107 of the outer enclosure 103 may define a trench 104 recessed within the outer enclosure 103. For example, one or more film holes 106 may extend into the trench 104. As such in the trench 104 may be fluidly coupled to the cooling cavity 116 via one or more of the film holes 106. In further embodiments, a plurality of trenches 104 with associated film holes 106 may be defined in the outer surface 107.

It should be recognized that the component 100 may include any combination of film holes 106 with or without associated trenches 104 at any position on the outer surface 107 and/or defined through the outer enclosure 103. In one embodiment, the film holes 106 may be positioned on the airfoil surface 85, such as along a span S of the airfoil 80. In such an embodiment, the cool air F may be directed toward the airfoil surface 85 to cool the component 100. In another embodiment, the film holes 106 may be positioned on the airfoil surface 85 along a chord C of the airfoil 80 and/or generally along the streamlines of the hot combustion gas 66. In other embodiments, the film holes 106 may be positioned on the leading edge 88 of the airfoil surface 85.

In one embodiment, the film holes 106 may be arranged in linear pattern, e.g., a straight line. In other embodiments, the film holes 106 may be a non-linear pattern. For example, the film holes 106 may define an arc, or, in other embodiments, the film holes 106 may define a zig-zag pattern and/or a switchback pattern. It should be recognized that the film holes 106 may define any shape or include any combination of shapes configured to direct the cool air F along the outer surface 107 of the outer enclosure 103. For example, a series of film holes 106 may define a straight segment, a curved segment, and a zig-zag segment.

In certain embodiments, the pressure of the cool air F in the cooling cavity 116 may be greater than the pressure of the hot combustion gas 66. For example, a greater pressure from within the component 100 may expel the cool air F out of the film holes 106. As such, the cool air F may flow along a contour of the component 100, such as the outer surface 107. For example, the cool air F may flow along the airfoil surface 85 and/or the inner band surface 105. It should be recognized that the cool air F may both cool the component 100 as well as create a film layer of cool air F between the hot combustion gas 66 and the component 100. As such, the compressed, cool air F may cool the component 100 and/or provide a protective film of compressed, cool air F to reduce the temperature of the component 100. The film holes 106 and/or cooling cavity 116 may also cool the component 100 via bore cooling. For example, the flow of cool air F through the cooling cavity 116 and subsequently the film holes 106 may further cool the component 100.

Figure 3:
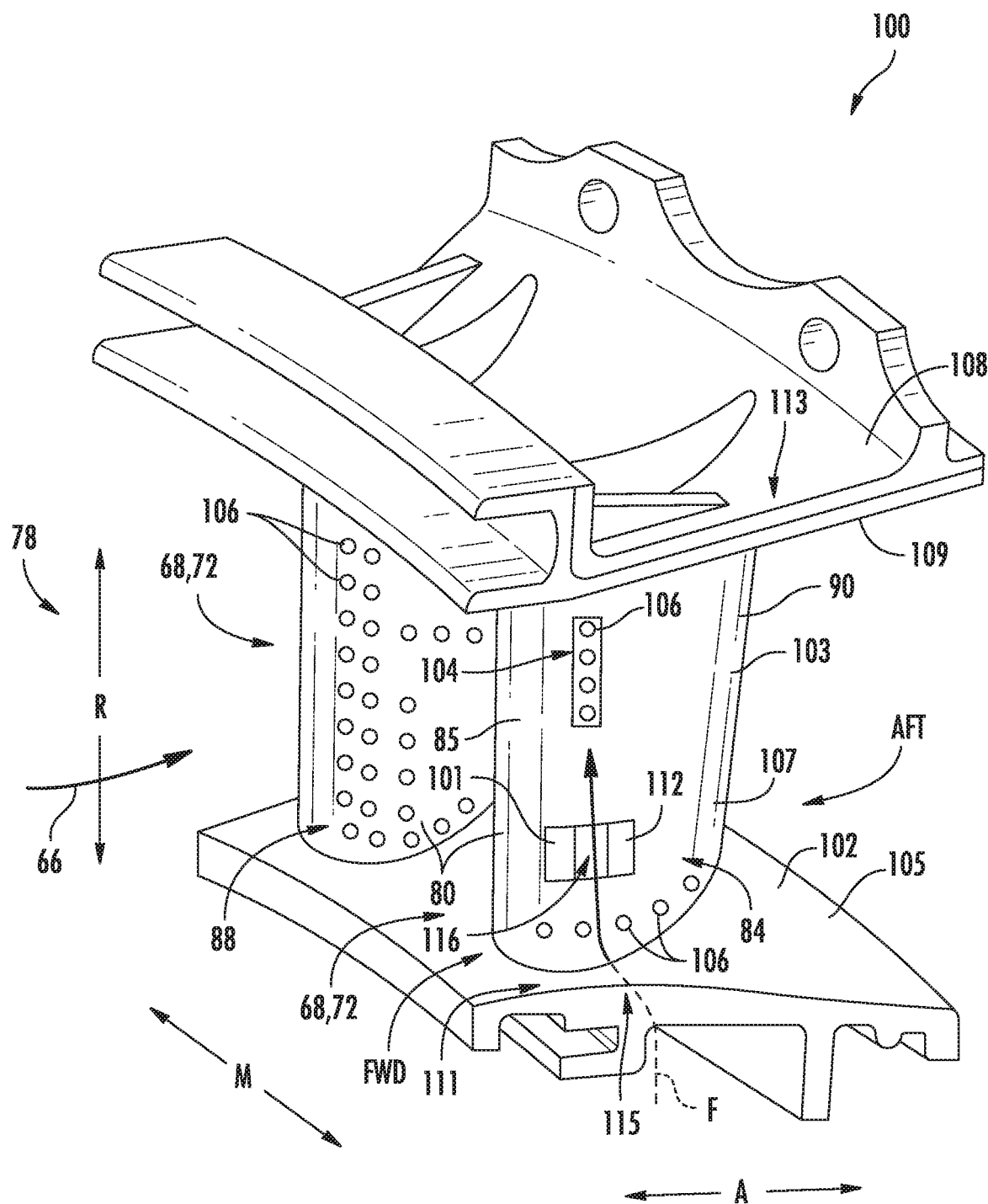
FIG. 3 illustrates another embodiment of the component in accordance with aspects of the present disclosure, particularly illustrating the component configured as a stator vane.

Referring now to FIG. 3, one embodiment of a component 100 is illustrated in accordance with aspects of the present disclosure. Particularly, FIG. 3 illustrates the component 100 configured as a stator vane. For example, the component 100 may be the HP turbine stator vane 68 of the HP turbine 28 and/or the LP turbine stator vane 72 of the LP turbine 30. In such embodiments, the component 100 may include an outer band 108 positioned at the second end 113 of the turbine stator vane, e.g., radially outward from the inner band 102. Further, the outer band 108 may include an outer band surface 109. For example, the outer band surface 109 may at least partially define the flowpath 78 for the hot combustion gas 66. As such, the outer band surface 109 may define an outer most boundary of the flowpath 78.

Each turbine stator vane 68, 72 may include the outer enclosure 103 configured as the airfoil 80, or, more particularly, configured as a vane, that extends from the first end 111, such as between the first end 111 and the second end 113. For example, the outer enclosure 103 and/or airfoil 80 may extend between the inner band 102 and the outer band 108. Each turbine stator vane 68, 72 airfoil 80 may have the same features as the airfoil 80 described above with respect to turbine rotor blade 70, 74. For example, airfoil 80 of the stator vane 68, 72 may have a pressure side 82 opposite a suction side 84. Opposite pressure and suction sides 82, 84 of each airfoil 80 may extend radially along the span S from a vane root at an inner band 102 to a vane tip at an outer band 108. Moreover, pressure and suction sides 82, 84 of the airfoil 80 may extend axially between a leading edge 88 and an opposite trailing edge 90. The airfoil 80 may further define the chord C extending axially between opposite leading and trailing edges 88, 90. Moreover, the airfoil 80 may define the width W between pressure side 82 and suction side 84, which may vary along the span S.

It will be appreciated that, although the airfoil 80 of turbine stator vane 68, 72 may have the same features as the airfoil 80 of turbine rotor blade 70, 74, the airfoil 80 of turbine stator vane 68, 72 may have a different configuration than the airfoil 80 of turbine rotor blade 70, 74. As an example, the span S of airfoil 80 of turbine stator vane 68, 72 may be larger or smaller than the span S of the airfoil 80 of the turbine rotor blade 70, 74. As another example, the width W and/or chord C of the airfoil 80 of the turbine stator vane 68, 72 may differ from the width W and/or chord C of the airfoil 80 of the turbine rotor blade 70, 74. Additionally, or alternatively, airfoils 80 of the LP turbine stator vanes 72 and/or airfoils 80 of HP turbine rotor blades 70 may differ in size, shape, and/or configuration from airfoils 80 of HP turbine stator vanes 68 and LP turbine rotor blades 74. However, it also should be understood that, while airfoils 80 may differ in size, shape, and/or configuration, the subject matter described herein may be applied to any airfoil 80 within the gas turbine engine 10, as well as other suitable components 100 of gas turbine engine 10.

The turbine stator vanes 68, 72 may direct the hot combustion gas 66 through the flowpath 78. Further, the turbine stator vanes 68, 72 may increase the speed of the hot combustion gas 66 thereby increasing the dynamic pressure while decreasing the static pressure of the hot combustion gas 66. In such embodiments, the outer band 108 may at least partially define the flowpath 78. Further, the airfoil surface 85 and/or the outer band surface 109 may be heated by the hot combustion gas 66 flowing through the flowpath 78.

The component 100 of FIG. 3 may include one or more film holes 106 and associated trenches 104 as described generally in regards to FIG. 2. Further, the film holes 106 may be fluidly coupled to the cool air supply 115 via the cooling cavity 116. The cooling cavity 116 may be at least partially defined by the core 101 and the outer enclosure 103. The component 100 may include film holes 106 arranged in a linear and/or non-linear shaped pattern or any other desirable arrangement. As such, the cool air F may be directed toward and cool the outer surface 107 of the outer enclosure 103, such as both the airfoil surface 85.

Figure 4:
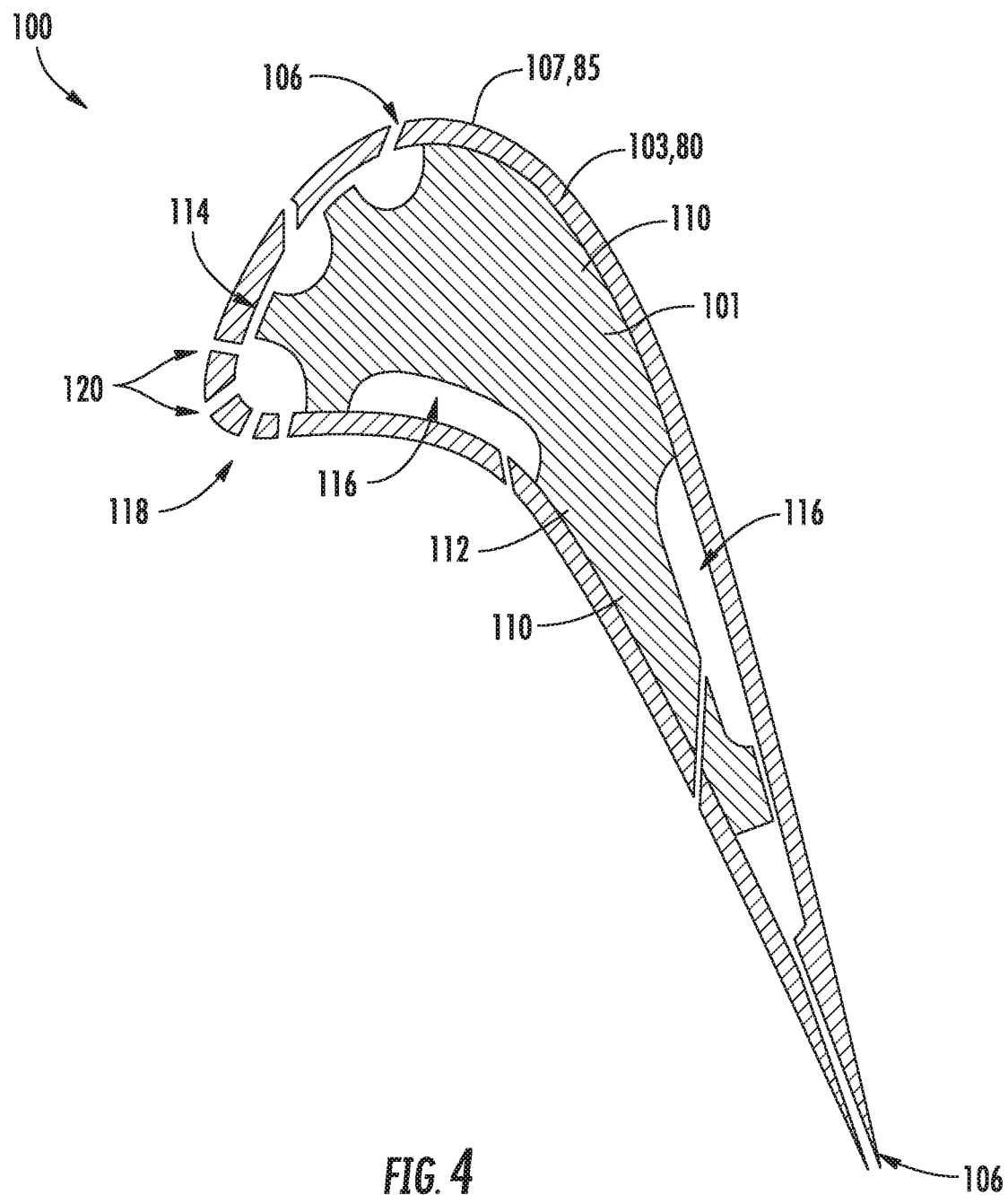
FIG. 4 illustrates another embodiment of the component according to aspects of the present disclosure, particularly illustrating a cross-section of the component.

Referring now to FIG. 4, one embodiment of a component 100 is illustrated according to aspects of the present disclosure. Particularly, FIG. 4 illustrates a cross-section of the component 100. It should be recognized that, the component 100 may be configured as a turbine rotor blade or a turbine stator vane, such as any the turbine rotor blades 70, 74 as described in regards to FIG. 2 or any of the turbine stator vanes 68, 72 as described in regards to FIG. 3. As such, the outer enclosure 103 may be configured as the airfoil 80 and the outer surface 107 may be the airfoil surface 85. Though, in other embodiments, the component 100 and/or outer enclosure 103 may be include any other structure exposed to the hot combustion gas 66.

The component 100 may include the core 101 and the outer enclosure 103. The core 101 may include the exterior surface 112 extending along a length between a first end 111 and a second end 113 (see, e.g., FIGS. 2 and 3). It should be recognized that the core 101 may generally have the same shape as the outer enclosure 103. For example, in embodiments where the outer enclosure 103 is an airfoil 80, the core 101 may also generally be shaped as an airfoil. In other embodiments, additional layers or materials may envelop the outer enclosure 103 or may be included in the outer enclosure 103. For example, the outer enclosure may be formed from various layers, and/or various thermal coatings may be applied or sprayed on the outer enclosure 103. Further, the core 101 may at least partially define the cooling cavity 116 on the exterior surface 112 extending from the first end 111 along at least a portion of the length of the core 101. For instance, the cooling cavity 116 may extend along the entire length of the core 101. The cooling cavity 116 is fluidly coupled to the cool air supply 115 at the first end 111 (see, e.g., FIGS. 2 and 3). As such, the cool air F may be supplied to the cooling cavity 116 without the need for any passages internally formed, machined, constructed, and/or or supplied through the core 101. As such, construction and/or assembly of a core 101 including multiple parts may be avoided.

It should be recognized that the cooling cavity 116 may be positioned anywhere along the exterior surface 112 of the core 101, such as at any position along a perimeter of the core 101. For instance, in embodiments where the outer surface 107 is the airfoil surface 85, the cooling cavity 116 may be positioned on at least one of the pressure side 82, suction side 84, leading edge 88, and/or trailing edge 90 anywhere along the span S of the airfoil 80 (see, e.g., FIGS. 2 and 3). Further, the cooling cavity 116 may extend between two or more portions of the airfoil 80. For example, one cooling cavity 116 may extend around the exterior surface 112 to approximately across the all three of the pressure side 82, leading edge 88, and suction side 84. It should be recognized that the core 101 may define an inner surface of the cooling cavity 116.

The outer enclosure 103 may include the outer surface 107. The outer enclosure 103 is positioned outside the core 101 and extends from the first end 111 of the core 101 along at least a portion of the length of the core 101. The outer enclosure 103 may be coupled to at least a portion of the exterior surface 112 of the core 101. In certain embodiments, the outer enclosure 103 may be adhered to at least a portion of the exterior surface 112. For example, the exterior surface 112 may include one or more contacting portions 110 where the outer enclosure 103 is adhered to the exterior surface 112. In addition, the outer enclosure 103 may at least partially define the cooling cavity 116. It should be recognized that the outer enclosure 103 may be coupled to the core 101 surrounding the cooling cavity 116, such as to define the boundaries of the cooling cavity 116. Further, in certain embodiments, the outer enclosure 103 may be coupled to the exterior surface 112 of the core 101 generally at locations where there is not a cooling cavity 116. It should be recognized that the outer enclosure 103 may be coupled to the core 101 using any suitable means, such as by adhesives, tape, welding, and/or mechanical fasteners (e.g., bolts, screws, and rivets).

The outer enclosure 103 may also define the film hole 106 in fluid communication with the cooling cavity 116 and extending through the outer enclosure 103. In certain embodiments, a plurality of film holes 106 may be defined through the outer enclosure 103 and in fluid communication with the cooling cavity 116. As such, it should be recognized that the film hole(s) 106 may also be fluidly coupled to the cool air supply 115 to provide cool air F to the outer surface 107. For example, the outer enclosure 103 may define a plurality of film holes 106 at each location along the length of the component 100, such as along the span S as illustrated in FIGS. 2 and 3. In other embodiments, the plurality of film holes 106 may be defined along another dimension of the component 100, e.g., along the chord C. It should be recognized that, in such embodiments, two or more film holes 106 may be defined at each location along the length of the component 100.

In one embodiment, the outer enclosure 103 may extend along the full length of the core 101 as shown in FIGS. 2 and 3. For example, the outer enclosure may be the airfoil 80 and may completely enclose the core 101 other than the film holes 106 defined through the outer enclosure 103. In a further embodiment, the cooling cavity 116 may extend along the full length of the core 101. For instance the cooling cavity 116 may provide the cool air F along the full length of the core 101 and/or the full length of the outer enclosure 103 via the one or more film holes 106. Further, the film hole(s) 106 may be defined anywhere along the outer surface 107 of the outer enclosure 103 where the film hole(s) 106 may be in fluid communication with the cooling cavity 116. In embodiments with a plurality of film holes 106, the film holes 106 may be positioned anywhere along the outer surface 107 of the outer enclosure 103 where each of the film holes 106 may be in fluid communication with the cooling cavity 116. Further, in other embodiments, one or more film holes 106 may be defined through the core 101 and the outer enclosure 103 generally on the opposite side of the core 101 that the cooling cavity 116 positioned. As such, the cool air F may pass through the core 101 before cooling the outer surface 107 of the outer enclosure 103 opposite the respective cooling cavity 116.

In a further embodiment, the core 101 may at least partially define a second cooling cavity 118 on the exterior surface 112 of the core 101 and extending from the first end 111 along at least a portion of the length of the core 101. The second cooling cavity 118 may be configured generally as the cooling cavity 116. For example, the second cooling cavity 118 may be fluidly coupled to the air supply, such as the cool air supply 115, at the first end 111. Additionally, the outer enclosure 103 may also at least partially define the second cooling cavity 118. Further, the outer enclosure 103 may define a second film hole 120 in fluid communication with the second cooling cavity 118 and extending through the outer enclosure 103 to supply compressed, cool air F from the cool air supply 115 to the outer surface 107 of the outer enclosure 103. It should be recognized that the second cooling cavity 118 and associated second film hole 120 may be positioned anywhere the cooling cavity 116 and film hole(s) 106 may be positioned. Further, the outer enclosure 103 may define a plurality of second film holes 120, each of which may be positioned anywhere along the outer surface 107 of the outer enclosure 103 where each of the second film holes 120 may be in fluid communication with the second cooling cavity 118, and thus the cool air supply 115.

In still further embodiments, the core 101 and outer enclosure 103 may define a plurality of cooling cavities 116, such as three or more, configured generally the same as the cooling cavity 116 and second cooling cavity 118 as described above. Further, associated film holes 106 may be defined through the outer enclosure 103 in fluid communication with the cooling cavities 116 to supply cool air F to the outer surface 107 of the outer enclosure 103. It should be recognized that a portion of the cooling cavities 116 may extend along the full length of the core 101 from the cool air supply 115 at the first end 111 to the second end 113. In other embodiments, some of the cooling cavities 116 may extend along only a portion of the core 101.

Still referring to FIG. 4, the core 101 may at least partially define a cross-over hole 114 fluidly coupling the cooling cavity 116 and the second cooling cavity 118 or any other cooling cavity 116. For instance, the cross-over hole 114 may be defined anywhere along the length of the cooling cavity 116 and/or second cooling cavity 118. Further, in other embodiments, the core 101 may define a plurality of cross-over holes 114 fluidly coupling the cooling cavity 116 and the second cooling cavity 118. For example, two or more cross-over holes 114 may be positioned along the length of the cooling cavity 116 and/or second cooling cavity 118, such as equally spaced. In embodiments with a plurality of cooling cavities 116, two or more cross-over holes 114 may fluidly couple a series of cooling cavities 116 together. It should be recognized that the cross-over hole(s) 114 may extend partially along the length of the core 101.

In a still further embodiment, at least one of the core 101 or the outer enclosure 103 may be formed from a composite material such as a ceramic matrix composite (CMC) material or other suitable composite material having high temperature capability. Composite materials generally comprise a fibrous reinforcement material embedded in matrix material, such as polymer or ceramic material. The reinforcement material serves as a load-bearing constituent of the composite material, while the matrix of a composite material serves to bind the fibers together and act as the medium by which an externally applied stress is transmitted and distributed to the fibers. For instance, both the core 101 and the outer enclosure 103 may be formed from a CMC material.

In embodiments where the core 101 is formed from a ceramic matrix composite, the cooling cavity may be green machined on the core 101 while the core 101 is in a green state. For example, the core in the green state may be only partially cured. It should be recognized that the core 101 in the green state may be more pliable, less brittle, and less rigid than a fully cured ceramic matrix composite core. As such, a core 101 in the green state may be more easily machined allowing more complex cooling cavities to be formed on the exterior surface 112 of the core 101. The process of forming the component 100 is more fully described below in regards to FIGS. 5-8 below.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophillite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, it may be desirable to form components 100 of the gas turbine engine 10, such as components within or defining the flowpath 78, e.g., stator vanes 68, 72, turbine rotor blades 70, 74, and/or other components, from composite materials such as CMC materials. The components 100 may be formed from a plurality of plies of the composite material, which are laid up together and/or assembled with other sub-assemblies, such as ply packs, preforms, and/or a stack of composite plies, to define the composite component. However, the cooling cavity(ies) 116 may be difficult to form in the core 101 of such components 100 after the thermal and/or chemical processing. More particularly, the core 101 may be too stiff or brittle to form intricate cooling cavities 116 and/or cross-over holes 114 as described herein. Additionally, a ply layup process to manufacture these components may not be accurate enough to form these types of intricate passages. Further, the outer enclosure 103 and/or plies forming the outer enclosure 103 may adhere more easily to a core 101 that is only partially processed (e.g., in the green state).

Figure 5:
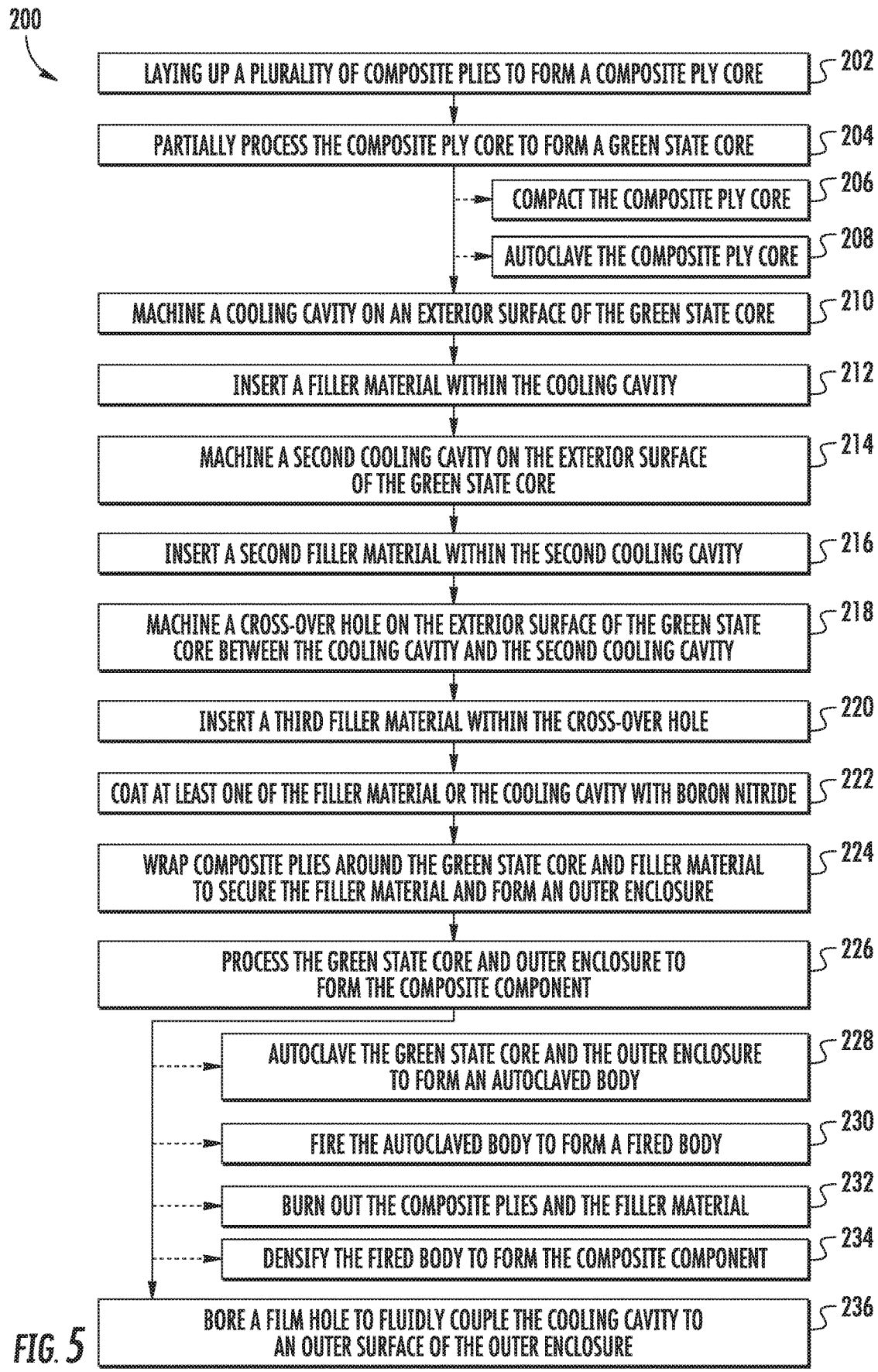
FIG. 5 depicts a method of forming a composite component according to aspects of the present disclosure.

Referring now to FIG. 5 a method (200) is depicted of forming a composite component according to aspects of the present disclosure. In certain embodiments, the component may be the component 100 for a gas turbine engine 10 as described generally in regards to FIGS. 1-4. For instance, the component 100 may be any of the turbine rotor blades 70, 74 and/or the turbine stator vanes 68, 72 as described above. As explained in greater detail below, the exemplary method (200) may include machining a layup of composite plies, or a composite ply pack, while the layup is in a green state to allow the formation of complex features (e.g., the cooling cavities 116 or the cross-over holes 114). The sub-assemblies may include other composite plies, which may be wet or debulked, a composite ply pack, a preform, or the like.

Figure 6:
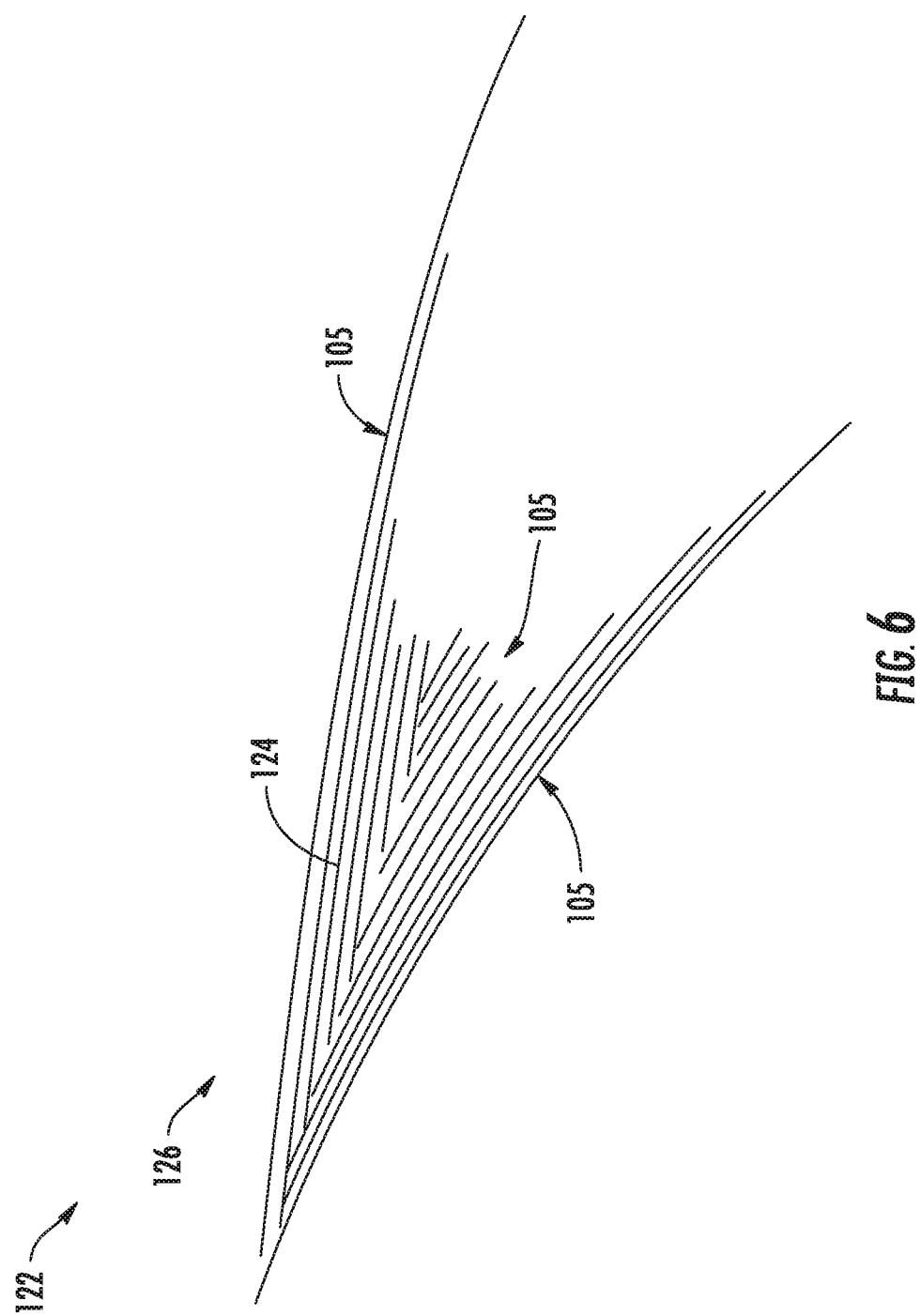
FIG. 6 illustrates a composite ply core according to aspects of the present disclosure, particularly illustrating the composite ply core including composite plies.

The method (200) may include (202) laying up a plurality of composite plies to form a composite ply core. Referring now also to FIG. 6, a composite ply core 122 is depicted according to aspects of the present disclosure. Particularly, FIG. 6 illustrates the composite ply core 122 including composite plies 124. It should be recognized the composite ply core 122 may become the core 101 described in regards to FIGS. 1-4, such as after the process of forming the component is completed. As shown, the plurality of composite plies 124 may include a composite material such as a CMC material. The composite plies 124 may be laid up on a tool, mandrel, mold, or other suitable supporting device or surface. Preferably, each composite ply 124 of the plurality of composite plies 124 is cut, e.g., from a tape as previously described, such that each composite ply 124 is oversized. That is, each of the plurality of composite plies 124 may be longer than a final length of the ply to provide machine stock for machining the green state ply pack to predetermined dimensions as described in greater detail herein. The plurality of composite plies 124 form a composite ply layup 126. In some embodiments, the composite ply layup 126 may be a ply pack layup (which also may be referred to as a composite preform) or the like, which may be generally referred to as a composite ply layup 126.

In a further embodiment of the method (200), at least one of the composite plies 124 may be a prepreg ply. For example, at least a portion of or all of the composite plies 124 used to form the composite ply core 122 may be prepreg plies. In one particular embodiment, all of the composite plies 124 may be prepreg plies. In a further embodiment, at least one of the composite plies 124 may a ceramic matrix composite ply, such as all of the composite plies 124. In certain embodiments, at least one of the composite plies 124 may be a ceramic matrix composite prepreg ply.

Another step of the method (200) may include (204) partially processing the composite ply core to form a green state core. As such, the composite ply layup 126 may be partially processed to form a green state layup of a green state core 130 (see, e.g., FIG. 7). In one embodiment of the method (200), partially processing the composite ply core may include (206) compacting the composite ply core. In another embodiment of the method (200), partially processing the composite ply core 122 may include (208) autoclaving the composite ply core. In a still further embodiment of the method (200), partially processing the composite ply core may include both compacting and autoclaving the composite ply core. For instance, the composite ply core 122 may be compacted and then processed in an autoclave.

The compaction may be performed at atmosphere, i.e., at room temperature and pressure. The autoclave processing may be performed at a reduced temperature, a reduced pressure, and/or for a shorter amount of time compared to a standard autoclave cycle. In some embodiments, partially processing the composite ply layup 126 may involve compaction only, i.e., the composite ply layup 126 may be compacted without also undergoing a reduced autoclave cycle. In other embodiments, to partially process the composite ply layup 126, the layup may undergo a reduced autoclave cycle without being separately compacted.

After partial processing, the composite plies 124 forming the composite ply layup 126 retain some flexibility and malleability. Such flexibility and malleability may help in machining the composite ply layup 126. That is, partially processing the composite ply layup 126 achieves a level of consolidation and curing adequate to obtain a strength suitable for further handling, manipulating, and machining of the green state layup. In contrast, a standard autoclave cycle is typically performed as part of processing a final ply and/or layup assembly to obtain the final component dimensions and to rigidize the component preform. More particularly, the standard autoclave cycle imparts stiffness to the final ply and/or layup assembly through complete drying and/or curing of the composite constituents and produces the final dimensions of the composite component through full consolidation of the plies and/or sub-assemblies.

Further, in embodiments in which the composite ply layup 126 is processed in an autoclave, the composite ply layup 126 may be autoclaved using soft and/or hard tooling. For instance, the composite ply layup 126 may be autoclaved using metallic tooling, i.e., hard tooling, that is shaped to impart a desired shape to the composite ply layup 126. As another example, the composite ply layup 126 may be autoclaved using soft tooling such as a vacuum bag, e.g., the composite ply layup 126 may be supported on a metal tool and then the composite ply layup 126 and tool may be bagged and the air removed from the bag to apply pressure to and compact the composite plies 124 forming the composite ply layup 126 before the composite ply layup 126 is processed in a reduced autoclave cycle as previously described.

The method (200) may further include (210) machining a cooling cavity on an exterior surface of the green state core. As stated, after the composite ply layup 126 is partially processed, the composite ply layup 126 is in a green state and thereby forms a green state layup, which may be one sub-assembly used to form the composite component, such as the component 100 of FIGS. 2-4. The green state layup may be machined, e.g., to form one or more cooling cavities on the exterior surface 112 of the green state core 130, for example the cooling cavities may generally be configured as the cooling cavities 116 of FIGS. 2-4. For example, the cooling cavity 116 may be machined into the green state core 130 from a first end 111 as illustrated in FIG. 2-3 such that the cooling cavities may be fluidly coupled to cool air supply 115 after final processing. It should be recognized that the cooling cavities 116 may be machined into any shape. For example, the cooling cavity 116 may define a circular cross-section, an arced cross-section, an elongated cross-section, or any other suitable shape including one or more curved and/or straight segments.

It should also be recognized that the shape of the green state core 130 or one or more edges or faces of the green state layup may be machined into the green state core 130 by removing a portion of at least one composite ply 124 within the composite ply layup 126. For example the shape of the exterior surface 112 of the core 101 of FIGS. 3 and 4 may be machined into the green state core 130. For example, oversized composite plies 124 may be machined to predetermined dimensions or a particular shape such that the green state layup has an edge and/or surface without irregularities in ply length. That is, a portion of at least one composite ply 124 may be removed along an edge of the green state layup, e.g., along the intersection of two surfaces 128 of the green state layup, or a portion of at least one composite ply 124 is removed along a section of the green state layup that is offset from an edge, e.g., along a surface 128 of the green state layup. Because machining the green state layup gives the layup a clean edge or surface 128, the composite plies 124 do not have to be perfectly aligned as they are laid up, e.g., imperfectly aligned composite plies 124 may be machined to a substantially uniform length. Moreover, the composite plies 124 may move or shift relative to one another during the partial processing portion of the method (200), particularly during compaction. However, by machining the composite ply layup 126 after partially processing the composite plies 124, irregularities in ply position may be removed, such that the relative movement between composite plies 124 does not affect the final component shape or create gaps that must be filled with a filler material.

Further, because the composite ply layup 126 is machined in its green state, the machining process may be referred to as green machining. Green machining may comprise one or more of electrical discharge machining (EDM), i.e., EDM drilling; laser machining; precision machining; or other suitable machining or cutting techniques or processes.

Additionally, the method (200) may include (212) inserting a filler material within the cooling cavity. In one embodiment, the filler material 132 (see, e.g., FIG. 7) may extend along a full length of the cooling cavity 116. Though, in other embodiments, the filler material 132 may only extend along a portion of the length of the cooling cavity 116. Further, two or more filler materials 132 may be positioned end-to-end within the cooling cavity 116 to extend along the full length of the cooling cavity 116 or a partial length of the cooling cavity 116. It should be recognized that the filler material 132 may prevent the cooling cavity 116 from collapsing during a process to finish forming a partially formed component 117 (see, e.g., FIG. 7). The filler material 132 may at least partially dissipates during the process to finish forming the partially formed component 117. In one embodiment, the filler material 132 may include at least one of a polymer matrix, a x-linked polyvinyl butyral, or a poly paraphenylene terephthalamide (e.g., Kevlar® from E. I. du Pont de Nemours and Company). Such filler material(s) 132 may dissolve and/or dissipate when exposed to high temperatures, such those used during the process to finish forming the partially formed component 117. In should be recognized that, in other embodiments, the filler material 132 may include any material that dissolves and/or dissipates during the process to finish forming the partially formed component 117. In a further embodiment, the filler material 132 may include a low melting temperature alloy such as a bismuth-tin alloy. Further, in such embodiments, a separate heat treatment may be necessary at an increased temperature to melt off the low melting temperature alloy (e.g., when the melting temperature of the alloy is higher than temperatures used during the process to finish forming the partially formed component 117).

A further step of the method (200) may include (224) wrapping composite plies around the green state core and filler material to secure the filler material and form an outer enclosure. For instance, the composite plies may be configured as the composite plies 124 used to form the composite ply core 122. It should be recognized the outer enclosure may generally be configured as the outer enclosure 103 as described in regards to FIGS. 2-4. Further, a portion of the composite plies 124 used to form the outer enclosure 103 may be prepreg plies. In a still further embodiment, at least one of the composite plies 124 may be a CMC prepreg ply, such as all of the composite plies 124. The composite plies 124 used to form the outer enclosure 103 may abut the contacting portions 110 (see, e.g., FIGS. 4 and 7) of the green state core 130. As such, it should be recognized that at least one of the composite plies 124 may be adhered to the green state core 130 during a final processing step of the method (200).

Figure 7:
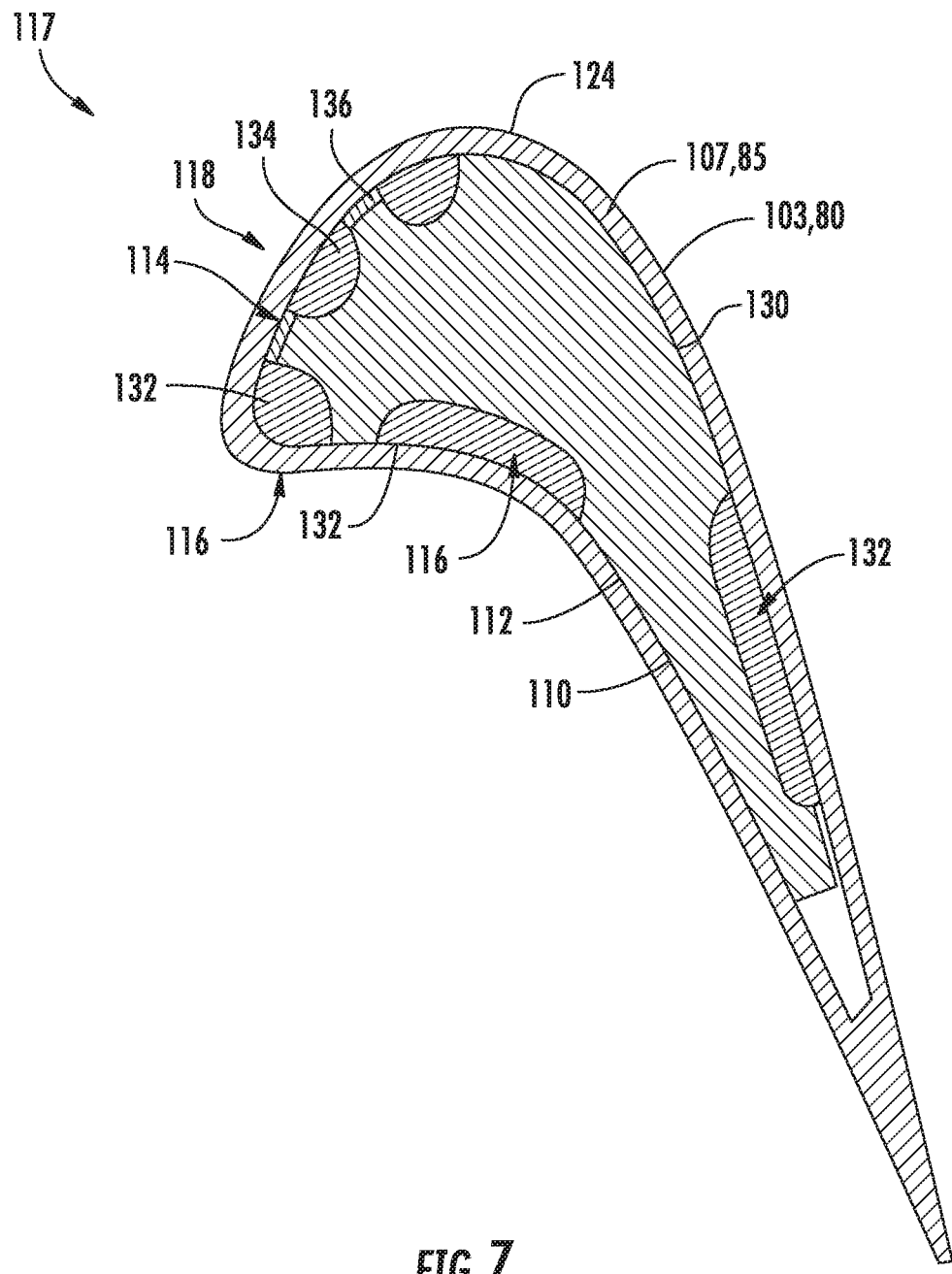
FIG. 7 illustrates a partially formed component according to aspects of the present disclosure.

Referring now to FIG. 7, the partially formed component 117 is illustrated according to aspects of the present disclosure. Particularly, the partially formed component 117 may be produced utilizing the any or all of the steps of the method (200) prior to the final processing step. Further, it should be recognized that the partially formed component 117 may form the component 100, as illustrated in FIGS. 2-4, after the final processing step.

The partially formed component 117 may generally be configured as the completed component 100 as described in regards to FIGS. 2-4. For instance, the partially formed component 117 may include a core, such as the green state core 130, and the outer enclosure 103. The core may include an exterior surface 112 extending along a length between a first end 111 and a second end 113, see, e.g., FIGS. 2-3. The core may at least partially define a cooling cavity 116 on an exterior surface 112 of the core extending from the first end 111 along at least a portion of the length of the core. Further, the cooling cavity 116 may be configured to be fluidly coupled to a cool air supply 115 at the first end 111, such as after final processing of the partially formed component 117 to form the component 100. Further, the partially formed component 117 may be configured to become a turbine rotor blade and/or a turbine stator vane. As such, the outer enclosure 103 may be configured as an airfoil 80 and an outer surface 107 may be an airfoil surface 85.

However, the partially formed component 117 may include additional features not present in the finalized component 100. The partially formed component 117 may further include a filler material 132 extending along at least a portion of the cooling cavity 116. In one embodiment, the core may include a green state core 130 formed from a carbon matrix composite material. Though, in other embodiments, the green state core 130 may be formed from any suitable composite materials.

It should also be recognized that the partially formed component 117 may not include all of the features of the completed component 100. For example the film holes 106 may be formed in a subsequent step prior to finalizing the partially formed component 117. Further, the cooling cavity 116 may only be fluidly coupled to the cool air supply 115 after the finalizing the component, e.g., after the filler material 132 has been removed.

The outer enclosure 103 may be positioned outside the core and extend from the first end 111 of the core along at least a portion of the length of the core. It should be recognized the outer enclosure 103 may be formed from one or more composite plies 124, which may be in an uncured and/or unprocessed state in the depicted partially formed component 117. Further, it should be recognized that several layers of composite plies 124 may be wrapped around the core, such as the green state core 130, to form the outer enclosure 103. For example at least one of the composite plies 124 may contact the exterior surface 112 of the core, such as at contacting portions 110. Additionally, various filler substances or intermediary layers of other materials may be included between composite plies 124. Additionally, the outer enclosure 103 may at least partially define the cooling cavity 116 and abut the filler material 132. For example, the outer enclosure 103 may secure the filler material 132 within the cooling cavity 116.

It should be recognized that the filler material 132 may have a circumference and/or perimeter the same as or slightly larger than the cooling cavity 116. As such, the filler material 132 may substantially fill the portion of the cooling cavity 116 where the filler material 132 is positioned. In certain embodiments, the filler material 132 may include a cross-sectional shape approximately the same as the cooling cavity 116 to assist inserting the filler material 132 within the cooling cavity 116. In other embodiments, the filler material 132 may include a pliable material that may be manipulated into the general shape of the cooling cavity 116. In one embodiment, the cooling cavity 116 may extend along the full length of the core, and the filler material 132 may extend along a full length of the cooling cavity 116. In another embodiment, the outer enclosure 103 may extend along the full length of the core and abut the filler material 132 along the full length of the cooling cavity 116.

Referring now again to FIG. 5, the method (200) may include (214) machining a second cooling cavity on the exterior surface of the green state core. In such an embodiment, a further step may include (216) inserting a second filler material within the second cooling cavity. For example, as shown in FIG. 7, the partially formed component 117 may include a second cooling cavity 118 and a second filler material 134. It should be recognized that, in other embodiments, the method (200) may include machining a plurality of cooling cavities 116 on the exterior surface 112 of the green state core 130. Further, a plurality of associated filler materials 132 may be inserted in each of the plurality of cooling cavities 116.

For example, referring again to FIG. 7, the core of the partially formed component 117 may at least partially define a second cooling cavity 118 on the exterior surface 112 of the core and extending from the first end 111 along at least a portion of the length of the core. The second cooling cavity 118 may be configured generally as the cooling cavity 116. For instance, the second cooling cavity 118 may be configured to be fluidly coupled to the cool air supply 115 at the first end 111, such as after the final processing step of the method (200). Further, the outer enclosure 103 may also at least partially define the second cooling cavity 118. Such a partially formed component 117 with a second cooling cavity 118 may include a second filler material 134 extending along at least a portion of the second cooling cavity 118. In such an embodiment, the outer enclosure 103 may abut the second filler material 134 such that the outer enclosure 103 secures the second filler material 134 within the second cooling cavity 118.

Referring back to FIG. 5, the method (200) may include (218) machining a cross-over hole on the exterior surface of the green state core between the cooling cavity and the second cooling cavity. Such a cross-over hole 114 may allow the cooling cavities 116 to be fluidly coupled after the partially formed component 117 is complete. It should be recognized that a plurality of cross-over holes 114 may be machined between the cooling cavity 116 and the second cooling cavity 118. Further, such cross-over holes 114 may be equally space along the length of at least one of the cooling cavities 116. In other embodiments, the cross-over holes 114 may define non-uniform gaps between each cross-over hole 114. It should be recognized that the cross-over hole(s) 114 may be machined on the exterior surface 112 of the green state core 130 using the same procedure the cooling cavity(ies) 116 are machined into the green state core 130. Though, in other embodiments, slots may be cut in the composite plies 124 before the composite plies 124 are laid up to form the composite ply layup 126. Further, slots of adjacent composite plies 124 may add together to form a composite ply layup 126 and/or green state core 130 with crossover holes 114. Further, the cooling cavities 116 may be machined adjacent to the crossover hole(s) 114 such that the crossover hole(s) 114 fluidly couple the cooling cavities 116.

In embodiments with three or more cooling cavities 116, one or more cross-over holes 114 may be machined between each cooling cavity 116 and an adjacent cooling cavity 116. For example, two or more cooling cavities 116 may be fluidly coupled in a series by the cross-over holes 114. In other embodiments, the cross-over holes 114 may be machined on the exterior surface 112 of the green state core 130 between groups of cooling cavities 116 and/or one or more pairs of cooling cavities 116. In one embodiment, the method (200) may include (220) inserting a third filler material within the cross-over hole. For example, a third filler material 136 may be inserted within each cross-over hole 114 machined on the green state core 130. In another embodiment, the third filler material(s) 136 may be inserted within a portion of the cross-over holes 114. It should be recognized the third filler material 136 may generally be configured as the filler material 132 and/or the second filler material 134.

Referring back to the partially formed component 117 of FIG. 7, the core may at least partially define the cross-over hole 114 configured to fluidly coupling the cooling cavity 116 and the second cooling cavity 118, such as after the final processing step to finish forming the partially formed component 117. In some embodiments, the partially formed component 117 may further include the third filler material 136 extending between the cooling cavity 116 and the second cooling cavity 118. The outer enclosure 103 may abut the third filler material 136 such that the outer enclosure 103 secures the third filler material 136 within the cross-over hole 114. It should be recognized that a third filler material 136 may be secured in any cross-over hole 114 between adjacent cooling cavities 116.

Referring again to FIG. 5, the method (200) may include (222) coating at least one of the filler material or the cooling cavity with boron nitride. For example, the filler material 132, the second filler material 134, and/or the third filler material 136 may be doped in boron nitride. It should be recognized that coating the filler material 132, 134, 136 with boron nitride may prevent certain materials, such as silicon, from filling the cooling cavity 116 while processing the green state core 130 and outer enclosure 103. More specifically, in certain embodiments, the boron nitride may adhere to the cooling cavity 116 after the filler material 132, 134, 136 dissipates, dissolves, and/or burns out. As such, the left over boron nitride may at least partially seal the cooling cavity 116 from silicon leaking into and filling the cooling cavity 116. Though, in other embodiments, the boron nitride may be adhered directly to the surfaces of the cooling cavity 116. In still further embodiment, the filler material 132 may further include the boron nitride. For instance, the boron nitride may be throughout the filler material 132 and left behind on the surfaces of the cooling cavity 116 after remaining parts of the filler material dissipate, dissolve, and/or burn out.

In another step, the method (200) may include (226) processing the green state core and outer enclosure to form the composite component. In one embodiment, processing the green state core 130 and outer enclosure 103 may include (228) autoclaving the green state core and the outer enclosure to form an autoclaved body. Further, another step may include (230) firing the autoclaved body to form a fired body. In some embodiments, processing the green state core 130 and outer enclosure 103 may include an additional burn out step, e.g., (232) burning out the composite plies and the filler material. In certain embodiments, the filler material 132 may not dissolve and/or melt at the temperature used to fire the autoclaved body. For example, low melting temperature alloys (e.g., bismuth-tin alloys) may require an additional burn out at an increased temperature. An additional step may include (234) densifying the fired body to form the composite component. In certain embodiments, processing the green state core 130 and the outer enclosure 103 may include at least one of melt infiltration or polymer infiltration and pyrolysis.

For example, processing may include autoclaving the assembled partially formed component 117 using a standard autoclave cycle, rather than a reduced autoclave cycle as previously described, to form an autoclaved body. In embodiments in which the composite material is a CMC material, the autoclaved body then may undergo firing (or burn-off) to form a fired body, followed by densification to produce a densified CMC component that is a single piece component, i.e., the component is a continuous piece of CMC material. For instance, after autoclaving, the component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

In certain embodiments, the method (200) may include (236) boring a film hole to fluidly couple the cooling cavity to an outer surface of the outer enclosure. For example, a drill, a milling machine, or other capable machine may be used to bore a film hole 106 through the outer enclosure 103. In certain embodiments, a plurality of film holes 106 may be bored through the outer enclosure 103, such as two or more film holes 106. It should be recognized that the film hole(s) 106 may be bored at any location where boring will create a film hole 106 into the cooling cavity 116. For example, the film hole(s) 106 may be placed anywhere as described in FIGS. 2 and 3. More particularly, in embodiments where the outer enclosure 103 defines an airfoil 80, the film hole(s) 106 may be placed equally along a span S and/or chord C of the outer enclosure 103. Such equally spaced film holes 106 may provide a more even supply of compressed, cool air F to the outer surface 107 of the outer enclosure 103.

Optionally, after processing, the composite component may be finish machined, if and as needed, and coated with one or more coatings, such as an environmental barrier coating (EBC). For example, the composite plies 124 that are wrapped around the core 101 may be oversized such that a portion of the composite plies 124 extend beyond the desired trailing edge 90 of the airfoil 80. Accordingly, after processing, the composite plies 124 may be machined to define the trailing edge 90. In other embodiments, the composite plies 124 may be machined after the outer enclosure 103 is autoclaved but before the outer enclosure 103 is fired and densified.

Of course, the method (200) described with respect to FIG. 5 is provided by way of example only. As such, other known methods or techniques for compacting and/or curing composite plies 124, as well as for densifying a CMC component, may be utilized. Alternatively, any combinations of these or other known processes may be used and in any suitable order. Further, although the method (200) of FIG. 5 is described relative to a turbine nozzle blades and turbine stator vanes including airfoils 80 as exemplary composite components, the method (200) also may be used to form other composite components. For instance, the composite component may be an airfoil trailing edge portion; an integral turbine rotor blade and platform; a turbine nozzle band; a turbine nozzle having an integral inner band, airfoil, and outer band; a combustor liner; a combustor dome; a shroud; etc.

Figure 8:
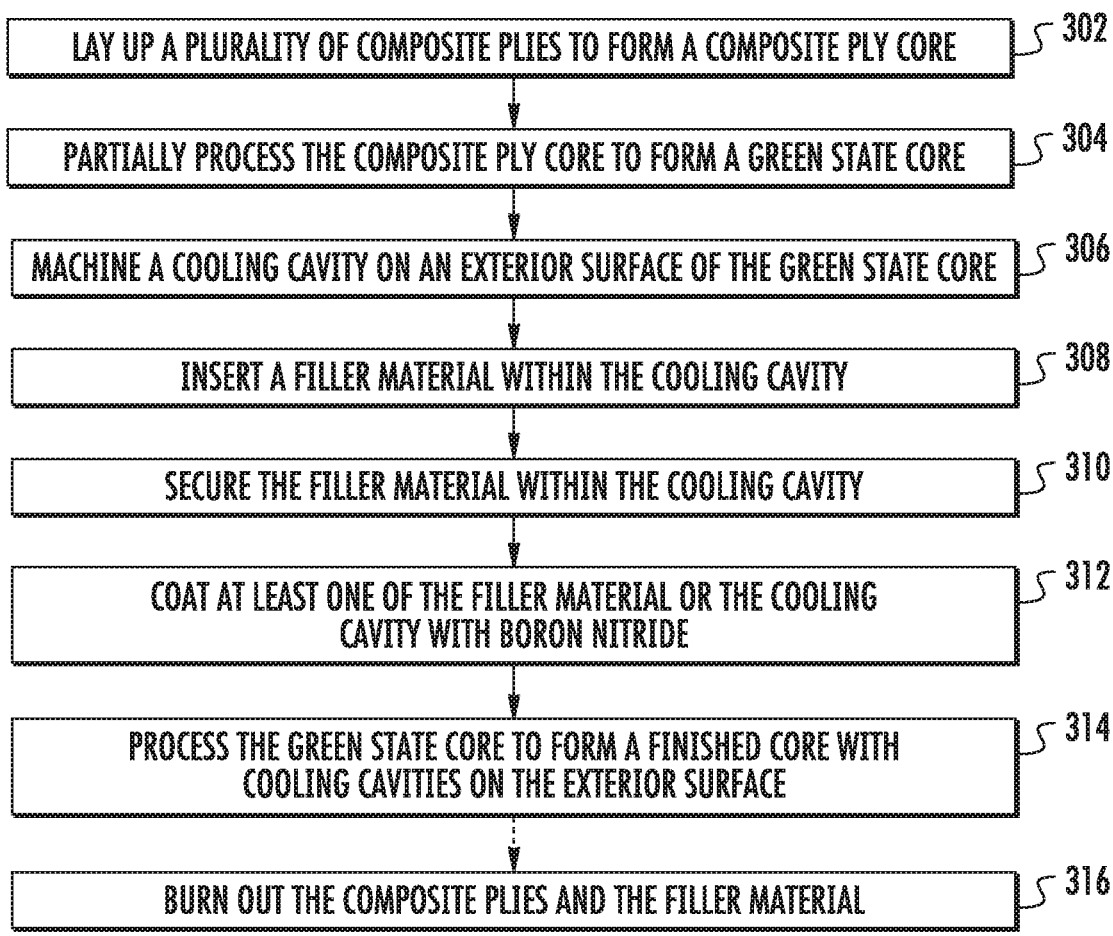
FIG. 8 depicts another method according to aspects of the present disclosure, particularly illustrating a method of forming a cooling cavity within a composite component.

Referring now to FIG. 8, another method (300) is illustrated according to aspects of the present disclosure. Particularly, FIG. 8 illustrates a method (300) of forming a cooling cavity within a composite component. The method (300) may include (302) laying up a plurality of composite plies to form a composite ply core. Another step may include (304) partially processing the composite ply core to form a green state core. The method (300) may further include (306) machining a cooling cavity on an exterior surface of the green state core. A further step may include (308) inserting a filler material within the cooling cavity. The method (300) may also include (310) securing the filler material within the cooling cavity. For example, in certain embodiments, the filler material 132 may be secured using composite plies 124, such as composite plies 124 of the outer enclosure 103. In other embodiments, the filler materials(s) 132 may be secured using any other structure, apparatus, and/or component. For example, the filler materials 132 may be secured using a mold, autoclave, rig, and/or other suitable enclosure. An additional step of the method (300) may include (314) processing the green state core to form a finished core with cooling cavities on the exterior surface.

In one embodiment of the method (300), processing the green state core may include (316) burning out the composite plies and the filler material. In certain embodiments, the filler material 132 may include at least one of a polymer matrix, a x-linked polyvinyl butyral, a poly paraphenylene terephthalamide, or a low melting temperature alloy (e.g., a bismuth-tin alloy). Still, in other embodiments, the method (300) may include (312) coating at least one of the filler material or the cooling cavity with boron nitride. It should be further understood that the method (300) may further include any of the additional features as described herein.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a composite component, comprising:

laying up a plurality of composite plies to form a composite ply core;

partially processing the composite ply core to form a green state core;

machining a first cooling cavity and a second cooling cavity on an exterior surface of the green state core, the exterior surface extending along a length of the green state core between a first end and a second end, the first and second cooling cavities each being machined to extend from the first end along at least a portion of the length of the green state core;

machining a cross-over hole on the exterior surface of the green state core between the first cooling cavity and the second cooling cavity;

inserting a filler material within the first cooling cavity;

wrapping composite plies around the green state core and filler material to secure the filler material and form an outer enclosure;

processing the green state core and outer enclosure to form the composite component; and boring a first film hole to fluidly couple the first cooling cavity to an outer surface of the outer enclosure, boring a second film hole to fluidly couple the second cooling cavity to the outer surface of the outer enclosure.

2. The method of claim 1, further comprising:
inserting a second filler material within the second cooling cavity.

3. The method of claim 2, further comprising:
inserting a third filler material within the cross-over hole.

4. The method of claim 1, wherein at least one of the composite plies is a prepreg ply.

5. The method of claim 1, wherein at least one of the composite plies is a ceramic matrix composite ply.

6. The method of claim 1, wherein partially processing the composite ply core comprises compacting the composite ply core.

7. The method of claim 1, wherein processing the green state core and outer enclosure comprises:
autoclaving the green state core and the outer enclosure to form an autoclaved body;
firing the autoclaved body to form a fired body; and
densifying the fired body to form the composite component.

8. The method of claim 1, wherein processing the green state core and outer enclosure comprises:
burning out the composite plies and the filler material.

9. The method of claim 1, wherein processing the green state core and the outer enclosure comprises:
at least one of melt infiltration or polymer infiltration and pyrolysis.

10. The method of claim 1, wherein the filler material comprises at least one of a polymer matrix, a x-linked polyvinyl butyral, or a poly paraphenylene terephthalamide.

11. The method of claim 1, further comprising:
coating at least one of the filler material or the first cooling cavity with boron nitride.

12. The method of claim 1, wherein the composite component is a gas turbine engine component and is at least one of a turbine rotor blade or a turbine stator vane.

13. A method of forming cooling cavities within a composite component, comprising:

laying up a plurality of composite plies to form a composite ply core;

partially processing the composite ply core to form a green state core;

machining a first cooling cavity and a second cooling cavity on an exterior surface of the green state core, the exterior surface extending along a length of the green state core between a first end and a second end, the first and second cooling cavities each being machined to extend from the first end along at least a portion of the length of the green state core;

machining a cross-over hole on the exterior surface of the green state core between the first cooling cavity and the second cooling cavity;

inserting a filler material within the first cooling cavity;

securing the filler material within the first cooling cavity;

processing the green state core to form a finished core with the first and second cooling cavities on the exterior surface; and boring a first film hole to fluidly couple the first cooling cavity to an outer surface of the outer enclosure, boring a second film hole to fluidly couple the second cooling cavity to the outer surface of the outer enclosure.

14. The method of claim 13, wherein the filler material comprises at least one of a polymer matrix, a x-linked polyvinyl butyral, or a poly paraphenylene terephthalamide.

15. The method of claim 13, further comprising:
coating at least one of the filler material or the cooling cavity with boron nitride.

16. The method of claim 1, wherein the first cooling cavity extends along a full length of the core.

17. The method of claim 1, further comprising machining a second cross-over hole on the exterior surface of the green state core between the first cooling cavity and the second cooling cavity, such that the green state core defines at least two cross-over holes that are positioned along the length of the green state core.

18. The method of claim 1, further comprising machining a third cooling cavity on the exterior surface of the green state core and machining a second cross-over hole on the exterior surface of the green state core between the second cooling cavity and the third cooling cavity.

19. The method of claim 1, wherein the cross-over hold extends partially along the length of the green state core.

20. The method of claim 1, wherein machining the first cooling cavity includes machining the first cooling cavity at a first depth, machining the second cooling cavity includes machining the second cooling cavity at a second depth, and machining the cross-over hole includes machining the cross-over hole at a third depth that is less than both the first depth and the second depth.

* * * * *